US011474784B2

(12) United States Patent
Bartolucci et al.

(10) Patent No.: US 11,474,784 B2
(45) Date of Patent: Oct. 18, 2022

(54) COMPUTER-IMPLEMENTED METHODS AND SYSTEMS RELATING TO ARITHMETIC CODING FOR SERIALISED ARITHMETIC CIRCUITS

(71) Applicant: nChain Licensing AG, Zug (CH)

(72) Inventors: Silvia Bartolucci, London (GB); Simone Madeo, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 0 days.

(21) Appl. No.: 17/041,801

(22) PCT Filed: Mar. 15, 2019

(86) PCT No.: PCT/IB2019/052112
§ 371 (c)(1),
(2) Date: Sep. 25, 2020

(87) PCT Pub. No.: WO2019/186316
PCT Pub. Date: Oct. 3, 2019

(65) Prior Publication Data
US 2021/0026599 A1 Jan. 28, 2021

(30) Foreign Application Priority Data

Mar. 27, 2018 (GB) ..................................... 1804948
Aug. 24, 2018 (GB) ..................................... 1813863

(51) Int. Cl.
*G06F 7/48* (2006.01)
*H03M 7/40* (2006.01)
(52) U.S. Cl.
CPC ............ *G06F 7/48* (2013.01); *H03M 7/4006* (2013.01)

(58) Field of Classification Search
CPC .......................... H03M 7/4006; H03M 7/4012
See application file for complete search history.

(56) References Cited

U.S. PATENT DOCUMENTS 6,377,706 B1 4/2002 de Queiroz
2009/0119654 A1 5/2009 Kawahito et al.
(Continued)

FOREIGN PATENT DOCUMENTS

WO 2011000799 A1 1/2011

OTHER PUBLICATIONS

Kopsba et al., "Hawk: The Blockchain Model of Cryptography and Privacy-Preserving Smart Contracts", pp. 839-858. (Year: 2016).*
(Continued)

*Primary Examiner* — Chuong D Ngo
(74) *Attorney, Agent, or Firm* — Davis Wright Tremaine LLP

(57) ABSTRACT

Techniques described herein may be utilized to implement methods and systems for lossless compression and serialization of arithmetic circuits to a bit stream using compression techniques such as the arithmetic coding. An arithmetic circuit representing a smart contract may be compressed using arithmetic coding, thereby generating a compressed arithmetic circuit that can be stored or broadcast to a blockchain network using less computational resources (e.g., data storage resources) than would otherwise be needed to store the arithmetic circuit. The arithmetic circuit can be efficiently compressed using entropy coding based on the frequency of elements in the data structure, such as the arithmetic operator types. Instructions for de-serialization and de-compression can also be embedded in the bit stream, and can be used (e.g., by another computer system) to reconstruct the original circuit in a lossless manner.

18 Claims, 10 Drawing Sheets

(56) References Cited

U.S. PATENT DOCUMENTS

| | | |
|---|---|---|
| 2009/0313596 A1 | 12/2009 | Lippmann et al. |
| 2010/0195739 A1 | 8/2010 | Lu et al. |
| 2017/0041606 A1 | 2/2017 | Matsumura |
| 2017/0142103 A1 | 5/2017 | Bringer et al. |
| 2017/0212968 A1 | 7/2017 | Diao et al. |
| 2017/0316119 A1 | 11/2017 | Joseph et al. |

OTHER PUBLICATIONS

Yang et al.,"An Approach to Graph and Netlist Compression", pp. 33-42. (Year: 2008).*
Wikipedia ,"Arithmetic coding", 13 pages. (Year: 2018).*
Nelson, "Data Compression With Arithmetic Coding", 28 pages. (Year: 2014).*
Kosba et al., "Hawk: The Blockchain Model of Cryptography and Privacy-Preserving Smart Contracts," IEEE Symposium on Security and Privacy, May 22, 2016, 31 pages.
Wikipedia, "Arithmetic coding," Wikipedia the Free Encyclopedia, Mar. 24, 2018, https://en.wikipedia.org/w/index.php?title=Arithmetic_coding&oldid=832173421, 13 pages.
Wikipedia, "Huffman coding," Wikipedia the Free Encyclopedia, Feb. 24, 2018, https://en.wikipedia.org/w/index.php?title=Huffman_coding&oldid=827366029, 11 pages.
Wikipedia, "JPEG," Wikipedia the Free Encyclopedia, 2000, https://en.wikipedia.org/wiki/JPEG, 35 pages.
Yang et al., "An Approach to Graph and Netlist Compression," retrieved from https://ieeexplore.ieee.org/document/4483281, Mar. 2008, 10 pages.
Antonopoulos, "Mastering Bitcoin—Unlocking Digital Cryptocurrencies," O'Reilly Media, Inc., Dec. 20, 2014, 282 pages.
Bootle et al., "Linear-Time Zero-Knowledge Proofs for Arithmetic Circuit Satisfiability," International Conference on the Theory and Application of Cryptology and Information Security, Dec. 3, 2017, https://eprint.iacr.org/2017/872.pdf, 54 pages.
Delmolino et al., "Step by Step Towards Creating a Safe Smart Contract: Lessons and Insights from a Cryptocurrency Lab," International Conference on Financial Cryptography and Data Security, Feb. 26, 2016, 15 pages.
Gennaro et al., "Quadratic Span Programs and Succint NIZKs without PCPs," Annual International Conference on the Theory and Applications of Cryptographic Techniques, May 26, 2013, 20 pages.
Huffman, "A method for the construction of minimum-redundancy codes," Proceedings of the IRE 40(9):1098-101, Sep. 1952.
International Search Report and Written Opinion dated Dec. 6, 2019, Patent Application No. PCT/IB2019/052113, 14 pages.
Juels et al., "The Ring of Gyges: Using Smart Contracts for Crime," Proceedings of the 2016 ACM SIGSAC Conference on Computer and Communications Security, Oct. 24, 2016, 32 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Nakamoto, "Bitcoin: A Peer-to-Peer Electronic Cash System," Bitcoin, Oct. 31, 2008, https://bitcoin.org/bitcoin.pdf, 9 pages.
Nelson, "Data Compression With Arithmetic Coding," https://marknelson.us/posts/2014/10/19/data-compression-with-arithmetic-coding.html, Oct. 19, 2014, 29 pages.
Parno et al., "Pinocchio: Nearly Practical Verifiable Computation," IEEE Symposium on Security and Privacy, May 19, 2013, 16 pages.
Satoshi et al., "Connection Limits," Bitcoin Forum, Aug. 9, 2010, https://bitcointalk.org/index.php?topic=741.0; prev_next=prev, 2 pages.
Shannon, "A Mathematical Theory of Communication," The Bell System Technical Journal 27(3):379-423 and 623-656, Jul., Oct. 1948.
UK Commercial Search Report dated Oct. 1, 2018, Patent Application No. GB1804948.6, 5 pages.
Uk IPO Search Report dated Sep. 28, 2018, Patent Application No. GB1804948.6, 3 pages.
Wikipedia, "Space-time tradeoff," Wikipedia the Free Encyclopedia, Dec. 20, 2017, https://en.wikipedia.org/w/index.php?title=Space-time_tradeoff&oldid=816280979, 3 pages.
Yang et al., "An Approach to Graph and Netlist Compression," Data Compression Conference (Dec. 2008), Mar. 25, 2008, https://ieeexplore.ieee.org/document/4483281, 10 pages.

* cited by examiner

COMPUTER-IMPLEMENTED METHODS AND SYSTEMS RELATING TO ARITHMETIC CODING FOR SERIALISED ARITHMETIC CIRCUITS

FIELD OF INVENTION

This invention relates generally to techniques for reducing the data footprint used by arithmetic circuits (e.g., when stored on a disk or in memory), and more particularly to techniques for generating a serialised circuit by utilizing compression techniques, namely arithmetic coding techniques described here. Arithmetic circuits may be compressed in a lossless manner to produce a serialised circuit which can, at a later point in time, be used to perfectly reproduce the original circuit. An arithmetic circuit may be used to produce a program whose execution can be delegated to one or more nodes of a distributed computing environment. A protocol may be used to ensure correct execution of the program wherein a first computer system delegates execution of the program to a second computer system. The invention is particularly suited, but not limited to, for use in a blockchain network.

BACKGROUND OF INVENTION

In this document, we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is intended herein as including any protocol which is derived from or a variation of the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction —if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

One area of current research is the use of the blockchain for the implementation of "smart contracts". These are computer programs designed to automate the execution of the terms of a machine-readable contract or agreement. Unlike a traditional contract, which would be written in natural language, a smart contract is a machine executable program which comprises rules that can process inputs in order to produce results, which can then cause actions to be performed dependent upon those results.

SUMMARY OF INVENTION

Thus, it is desirable to implement a verifiable computation framework (e.g., using a Bitcoin network) in which a client computer system generates a smart contract represented as an arithmetic circuit and uses an encoding technique, namely the arithmetic coding to compress the arithmetic circuit, thereby generating a compressed arithmetic circuit that can be used to reduce the storage space requirements for storing and/or executing the smart contract. In turn, the compressed arithmetic circuit can be broadcast to a blockchain network and stored (e.g., in nodes of the blockchain network) in place of the uncompressed arithmetic circuit. A worker computer system may obtain the compressed arithmetic circuit and obtain an executable version of the smart contract (e.g., by de-compressing the compressed arithmetic circuit) and execute the smart contract on behalf of the client computer system according to various verifiable computation protocols.

Such an improved solution has now been devised.

Thus, in accordance with the present invention there is provided systems and methods as defined in the appended claims.

In accordance with the invention there may be provided a computer-implemented method for a node of a blockchain network, the computer-implemented method comprising: obtaining a set of symbols based on an arithmetic circuit representing a smart contract; reducing an amount of data to store the arithmetic circuit by at least: mapping a subset of the set of symbols to a range of coded values, selecting a coded value within the range of coded values, and representing, in a compressed arithmetic circuit, the first subset of the set of symbols with the coded value; and causing the compressed arithmetic circuit to be stored on node of a blockchain network.

Preferably, the compressed arithmetic circuit comprises a header, wherein the header encodes information usable to map sets of the set of symbols to different ranges of coded values—for example, a first symbol maps to a range [0-0.3), a second symbol maps to a range [0.3, 0.7), and a third symbol maps to a range [0.7, 1). The different ranges may be non-overlapping ranges so that a particular coded value corresponds to exactly one symbol or set of symbols.

Preferably, the coded value is a binary fraction, such as a binary value that is greater than or equal to zero and also less than one.

The coded value may be selected based on the coded value being represented by a threshold number of bits. For example, as between two different binary fractions in a range, the binary fraction that can be represented with fewer bits may be selected as the coded value.

Selecting the coded value may comprise: mapping a different subset of the set of symbols to a sub-range of the range of coded values; selecting the coded value from within the sub-range of the range of coded values; and wherein both the first subset and the second subset of symbols are represented by the coded value in the compressed arithmetic circuit.

The method may further comprise: obtaining a set of symbols based on an arithmetic circuit representing the smart contract; receiving a request to serialise an input file, the input file comprising a plurality of lines of code representing the arithmetic circuit; scanning at least a portion of the plurality and adding symbols of the set of symbols to a data structure; and wherein the set of symbols is obtained from the data structure.

The method may further comprise encoding a symbol of the set of symbols as a difference between the symbol and another symbol of the set of symbols.

Preferably, the arithmetic circuit comprises operators and wire identifiers, further wherein the set of symbols are operators and the wire identifiers are separately encoded according to an arithmetic coding scheme.

The method may further comprise obtaining the set of symbols by parsing a file encoding the arithmetic circuit to obtain identify a set of operators and sets of parameters for at least a portion of the set of operators.

Preferably, the range of coded values corresponds to a probability of the subset occurring in a pattern. For example, as between two sets of symbols, the set of symbols having a greater probability of occurring has a corresponding range of coded values that is, relatively speaking, larger.

Preferably, the subset of the set of symbols is one symbol.

Preferably, the compressed arithmetic circuit is broadcast to the blockchain network in place of the arithmetic circuit.

Preferably, a node of the blockchain network that receives the compressed arithmetic circuit is able to determine the arithmetic circuit from the compressed arithmetic circuit.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Figure 1:
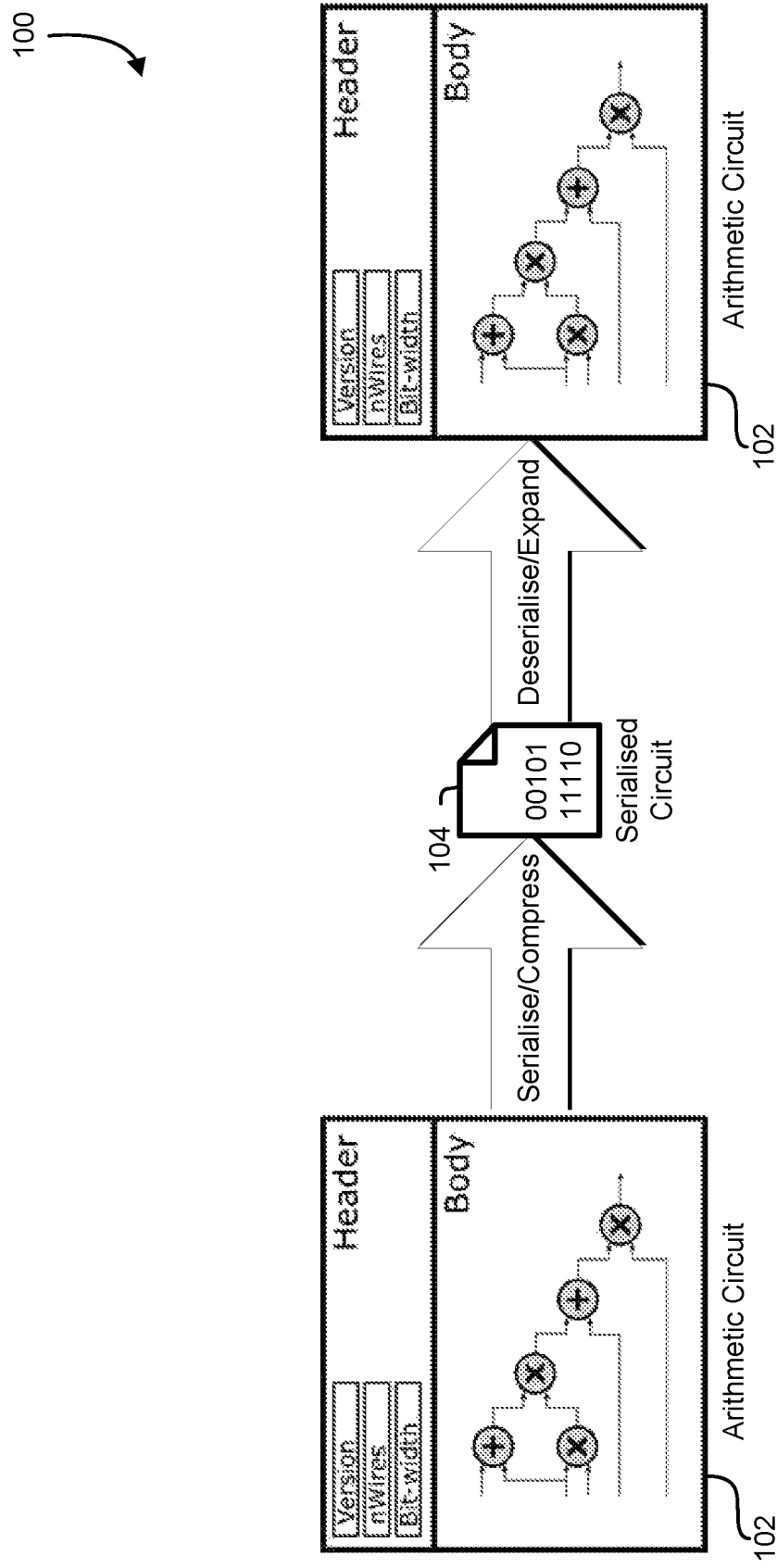
FIG. 1 illustrates the serialisation and de-serialisation of an arithmetic circuit, in an embodiment of the present disclosure.

We now provide an illustration of how the invention may be put into working practice according to one embodiment. The invention may be implemented in the context of a distributed computing environment wherein a first computing entity utilizes arithmetic circuits to generate programs whose execution can be delegated to computing entity of a distributed computing environment (e.g., a node of a blockchain network). Furthermore, the correct execution of the programs is computationally verifiable, such that a client computing entity that delegates execution of a program, generated based at least in part on the arithmetic circuit, which is able to verify that the program was correctly executed by a worker computing entity. In this way, various efficiencies to distributed computing environments may be realised, including enabling the client computing entity to delegate and verify execution of a program to a computer system under the control of another entity.

As described in greater detail below, we describe a possible implementation for compressing and serialising an arithmetic circuit to a binary stream of data using arithmetic coding. The binary stream of data may be de-serialised and decompressed in a lossless manner. Various advantages of serialising circuits may be realised, such as reducing the data storage footprint of the circuit (e.g., by storing the serialised circuit in lieu of the arithmetic circuit). For example, in the context of a blockchain network, an arithmetic circuit or a program derived from the arithmetic circuit may be encoded at least in part to a ledger of the blockchain network. By using techniques described herein to reduce the data storage footprint of an arithmetic circuit, the amount of data stored to a blockchain ledger may be reduced. Even small reductions to the data storage footprint of data stored in the blockchain are to be appreciated, as the blockchain ledger may be replicated by some or even all nodes of a blockchain network.

Specific structures or building blocks can be used to facilitate this conversion. In one or more embodiments, this representation can be seen as the first step for the construction of a comprehensive pipeline able to provide a distributed verifiable computation. The building blocks presented in this example are not intended to be an exhaustive list of all possible high-level language constructs handled by an embodiment of the invention. Moreover, alternate implementations of the presented examples can be provided. These fall within the scope of the person skilled in the art.

We now provide an illustrative embodiment of the invention. It is important to note, however, that this is an example of an application to which the invention may be put to use. The skilled person will understand that the invention can be put to advantageous use in other contexts and applications.

For our example, consider a protocol that allows users to generate applications using a Domain Specific Language (DSL). Once the application has been generated, its execution can be outsourced to untrusted parties (called "workers" or "provers"), while its correctness can be publicly verified. The protocol makes use of cryptographic primitives that ensure:

Completeness, i.e. the honest verifier will be convinced of the validity of the output if the protocol is correctly followed;
Soundness, i.e. no cheating prover can convince the honest verifier about the authenticity of the output;
Zero-knowledge, i.e. no cheating verifier learns anything other than the validity of the output.
Some benefits of the protocol may include:
Man-in-the-middle attacks are prevented since no communication between the participants is requested.
It makes it hard for malicious nodes to tamper with the data due to the use of the blockchain technologies.
Trusted third parties such as trusted hardware devices are avoided.
Contract validations do not imply code re-execution. Computations are not replicated by every node in the network. Instead, proofs of honest execution are stored in the public blockchain and used for validation purposes only.

Such a system would be capable of handling various types of applications, corresponding to various types of tasks and products. Due to its decentralized and distributed nature, the (Bitcoin) blockchain provides a well-suited environment for settling agreements between two (or more) parties.

Such a system needs to provide and facilitate programmability in a decentralized cryptocurrency system. However, it is recognised in the art that smart contract programming is an error-prone process. See Delmolino, K., et al. (2015). *Step by Step Towards Creating a Safe Smart Contract: Lessons and Insights from a Cryptocurrency Lab*, and Juels, A., et al. (2013). *The Ring of Gyges: Using Smart Contracts for Crime*.

Therefore, it would be advantageous to be able to use DSLs that make applications easier to write and to read by programmers, thus reducing error, reducing time, effort, cost and resources during the programming process. Ideally, non-specialist programmers would be able to write various types of applications without being required to implement cryptography. Instead, a compiler/interpreter would automatically compile the source code to a cryptographic protocol between the users and the blockchain. These are among the technical problems solved by the present invention.

FIG. 1 is an illustrative diagram 100 of an embodiment that can be implemented in accordance with the present disclosure. Techniques described herein may be utilized to serialise and de-serialise arithmetic circuits that are utilized in the execution of computer programs. The arithmetic circuit may be utilized to build a Quadratic Arithmetic Problem (QAP) that is compiled into a set of cryptographic routines for a client (e.g., key generation and verification) and a prover (e.g., computation and proof generation) in accordance with an embodiment. The client and prover may utilize a protocol to delegate execution of a program to the prover in a manner that allows the client to efficiently verify that the prover correctly executed the program. A serialised circuit may be utilized to improve the operation of computer systems by reducing the computing resources (e.g., hard disk space) needed in connection with an arithmetic circuit. In an embodiment, the arithmetic circuit comprises information represented as a set of symbols (e.g., arithmetic gates and values) that is compressed to produce a serialised circuit comprising a set of codes, wherein the set of symbols is derivable from the set of codes in a lossless manner. Transmission of compressed circuit may improve the effective data transmission bandwidth of computer systems by enabling a greater number of circuits to be transmitted. For example, if a compressed circuit reduces the size of an arithmetic circuit by 50%, the effective data transmission bandwidth may be doubled, since up to twice as many compressed arithmetic circuits may be transmitted using the same number of bytes (it should be noted that the actual data transmission bandwidth improvement may be less than double, accounting for data overhead such as packet headers that may not be compressed). Reducing the data footprint of an arithmetic circuit may reduce computer hardware requirements associated with the use of the arithmetic circuit, such as reducing the amount of short-term memory (e.g., RAM) data storage, and/or data bandwidth utilized by a computer system that uses, stores, or otherwise interacts with circuits as described herein. Transmission of compressed circuit may improve the effective data transmission bandwidth of computer systems by enabling a greater number of circuits to be transmitted. For example, if a compressed circuit reduces the size of an arithmetic circuit by 50%, the effective data transmission bandwidth may be doubled, since up to twice as many compressed arithmetic circuits may be transmitted using the same number of bytes (it should be noted that the actual data transmission bandwidth improvement may be less than double, accounting for data overhead such as packet headers that may not be compressed). Reducing the data footprint of an arithmetic circuit may reduce computer hardware requirements associated with the use of the arithmetic circuit, such as reducing the amount of short-term memory (e.g., RAM) data storage, and/or data bandwidth utilized by a computer system that uses, stores, or otherwise interacts with circuits as described herein.

Generally, an arithmetic circuit $C$ comprises wires that carry values from a field F and connect to logical and/or arithmetic gates. In an embodiment, the circuit $C$ can be represented by a set of data fields that includes arithmetic gates, input wires, and output wires. The circuit may further comprise a header that includes information such as a version number, a total number of wires, and a bit-width $n_{bit}$ that allows execution optimisations depending on the target execution environment (e.g., processor architecture). Compression of an arithmetic circuit may be achieved by removing data fields that are determinable from other fields, applying entropy coding schemes, and combinations thereof. Various types of simplification rules may be used as part of a compression routine based on the format in which the arithmetic circuit is encoded. For example, some information may not be required, such as wire identifiers for inputs, wire identifiers of output gates, a first input of a first gate, and a last output wire identifier may compressed (e.g., not explicitly encoded as part of the serialised circuit), or any combination thereof.

In various embodiments, an entropy coding or encoding scheme is applied to the arithmetic circuit or a portion thereof (e.g., based on the simplification rules described above). An entropy coding may be utilized to produce a variable-length code table for the serialisation of source symbols. A Huffman coding may be utilized to generate a code table in which source symbols that occur with greater frequency are encoded using shorter codes, and source symbols that occur less frequently are encoded using longer codes—the length of a code may be inversely proportional to the frequency that a source symbol or sequence occurs. Using these techniques, the arithmetic circuit can be compressed to a serialised circuit that requires less computing resources for storage in a long-term data storage medium (e.g., a hard disk drive) and short-term data storage (e.g., random access memory).

As described above, a Huffman code may be utilized to generate a code table. A Huffman code refers to a particular type of optimal prefix code that can be used to achieve lossless data compression. The output from a Huffman algorithm may be a variable-length code table (e.g., a codebook) for encoding a source symbol, e.g., a character or a command in a file. The algorithm, in an embodiment, derives the table from the estimated or measured probability or frequency of occurrence (weight) for each possible value from the source symbol: more common symbols are generally represented using fewer bits than less common symbols. In an embodiment, Huffman coding can be efficiently implemented to find a code in time linear to the number of input weights wherein the input weights are in a sorted order. This strategy may be optimal among methods encoding symbols separately. Huffman coding may use a specific method for choosing the representation for each symbol, resulting in a prefix code, i.e., the bit string representing some particular symbol is never a prefix of the bit string representing any other symbol.

Given a set of symbols $\{a_0, a_1, \ldots, a_{n-1}\}$ from an alphabet A with size n and their weights $\{p_0, p_1, \ldots, p_{n-1}\}$ usually proportional to probabilities, a tree with minimum weighted path length from the root is required. The output code $C(P)=\{c_0, c_1, \ldots, c_{n-1}\}$ is the tuple of binary codewords with minimum weighted path length L(C).

As defined by Shannon's source coding theorem, the information content h (in bits) of each symbol $a_i$ with non-null probability is $h(a_i)=\log_2(1/p_i)$. The entropy H (in bits) is the weighted sum, across all symbols $a_i$ with non-zero probability $p_i$, of the information content of each symbol:

$$H(A) = \sum_{p_i>0} p_i h(a_i) = -\sum_{p_i>0} p_i \log_2 p_i$$

The entropy is a measure of the smallest codeword length that is theoretically possible for the given alphabet with associated weights. In general, a Huffman code does not need to be unique: the set of Huffman codes for a given probability distribution is a non-empty subset of the codes minimizing L(C) for that probability distribution.

The serialised circuit can be used to derive the original arithmetic circuit using an expansion or decompression routine in a lossless manner. It should be noted "lossless" in this context refers to a type of compression algorithm wherein source data is perfectly derivable from the compressed data. In the context of digital compression, lossless compression may refer to each bit a source bit stream being derivable from compressed data comprising a set of symbols. Conversely, lossy compression may refer to a type of compression algorithm in which the compressed data is not able to derive each bit of a source bit stream from the compressed data—an example of lossy compression is the MP3 audio encoding format.

Figure 2:
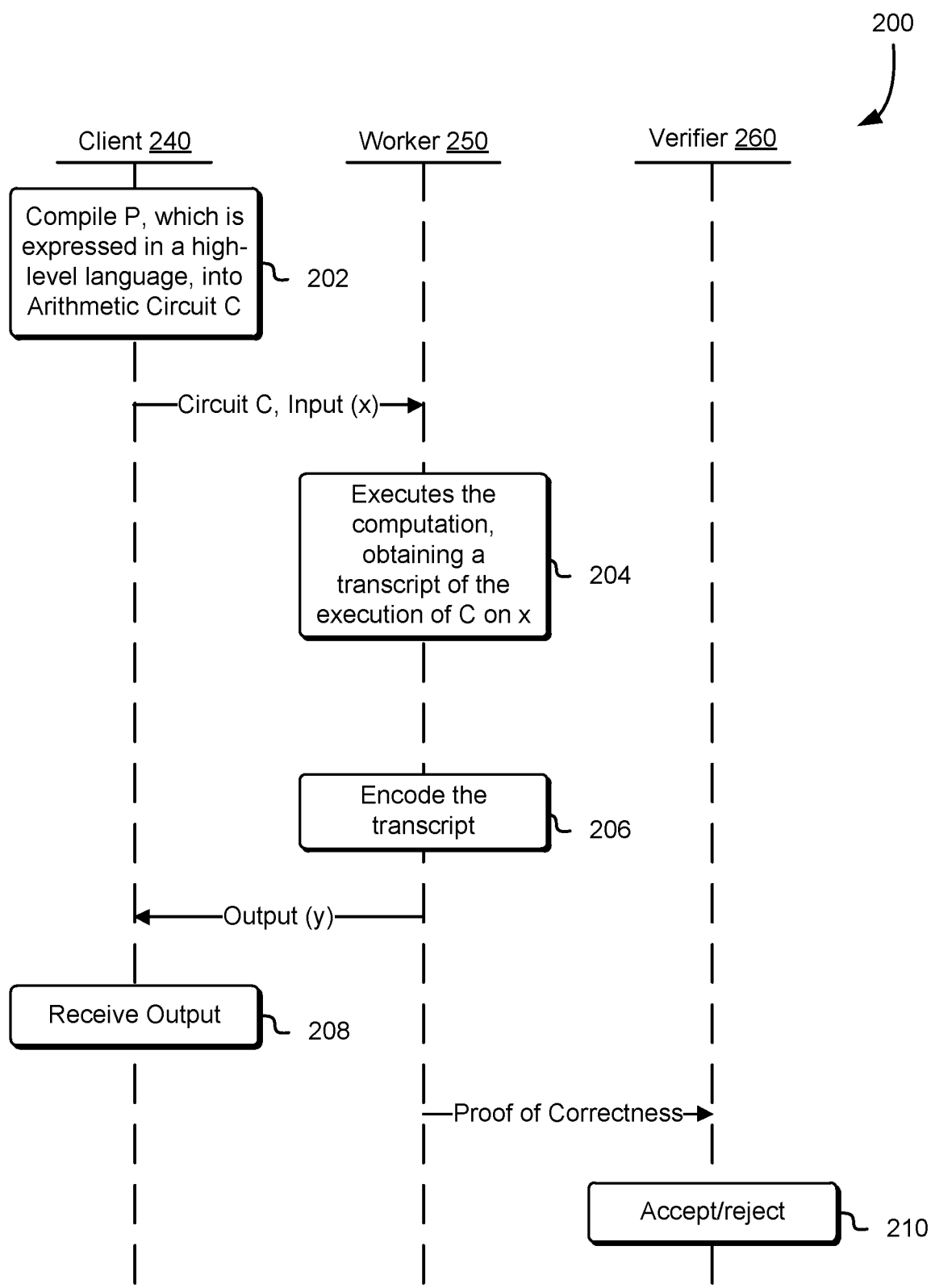
FIG. 2 illustrates a diagram illustrating an example of a swim diagram of verifiable computation and actors involved in an embodiment of the present disclosure.

FIG. 2 is a diagram illustrating an example of a swim diagram 200 of verifiable computation and actors involved in an embodiment of the present disclosure. As illustrated in FIG. 2, the diagram 200 of verifiable computation may include a client node 240, a worker (e.g., prover) node 250, and a verifier node 260 involved in performing steps in a verifiable computation protocol in an embodiment of the present disclosure. In embodiments, one or more of the client node 240, the worker node 250, or the verifier node 260 are nodes in a blockchain network.

In an embodiment, a setup phase involves writing contracts in a domain-specific language (DSL). An interpreter, which may be the client node 240, takes as input the source code and produces an arithmetic circuit $\mathcal{C}$, which consists of "wires" that carry values from a field $\mathbb{F}$ and connect to addition and multiplication gates. Note that arithmetic circuit itself may be a directed acyclic graph (DAG), rather than a hardware circuit, and the wires may be the edges in the DAG. However, it is contemplated that the arithmetic circuit could be embodied in a physical circuit having wires and logic gates. In 202, the client node 240 compiles a computation $\mathcal{P}$ written in a general-purpose language (GPL) into an arithmetic circuit $\mathcal{C}$. In the embodiment, the client node 240 supplies the arithmetic circuit $\mathcal{C}$ and the input $\mathcal{X}$ to the worker node 250.

From the circuit $\mathcal{C}$, an embodiment of the present disclosure can generate a quadratic program $\mathcal{Q}$ that includes a set of polynomials that provides a complete description of the original circuit $\mathcal{C}$. Then, public parameters may be generated to be used by the worker node 250 and the verifier node 260 in performing and verifying the quadratic program.

In 204, the worker node 250 executes the circuit $\mathcal{C}$ or the quadratic program Q on the input $\mathcal{X}$ and claims that the output is $\mathcal{Y}$. In some embodiments, the worker node 250 (i.e., the prover) is expected to obtain a valid transcript for $\{\mathcal{C}, \mathcal{X}, \mathcal{Y}\}$; thus, in 206, the worker node 250 encodes the transcript. In some examples, a valid transcript for $\{\mathcal{C}, \mathcal{X}, \mathcal{Y}\}$ is an assignment of values to the circuit wires such that the values assigned to the input wires are those of $\mathcal{X}$, the intermediate values correspond to the correct operation of each gate in $\mathcal{C}$, and the values assigned to the output wire(s) is $\mathcal{Y}$; if the claimed output is incorrect (i.e., $\mathcal{Y} \ne \mathcal{P}(\mathcal{X})$), then a valid transcript for $\{\mathcal{C}, \mathcal{X}, \mathcal{Y}\}$ does not exist.

In 208, the worker node 250 provides the output $\mathcal{Y}$ to the client node 240. In embodiments, a public evaluation key EK and the public verification key VK are derived using a secret value s selected by or from the client node 240. In the embodiments, the worker node 250 uses these public keys to evaluate the computation on a particular input $\mathcal{X}$. In embodiments, the output $\mathcal{Y}$, the values of the internal circuit wires, and EK are used to produce the proof-of-correctness π. The proof π can be stored on the blockchain and verified by multiple parties (e.g., the verifier node 260) without requiring the worker node 250 to separately interact with the multiple parties. In this manner, a verifier node 260 can validate the payment transaction in 210 using the public verification key VK and the proof π, thereby validating the contract.

A verifiable computation is a technique that allows the generation of proofs of computation. In an embodiment, such a technique is utilized by a client to outsource, to another computing entity referred to herein as a worker, the evaluation of a function $f$ on an input $\mathcal{X}$. In some cases, the client is computationally limited so that it is infeasible for the client to perform the evaluation of the function (e.g., the expected runtime of the calculation using computing resources available to the client exceeds a maximum acceptable threshold), although such need not be the case, and the client may, generally, speaking, delegate evaluation of the function $f$ on the input $\mathcal{X}$ based on any suitable criterion, such as computational runtime, computational cost (e.g., the financial cost of allocating computing resources to perform the evaluation of the function), and more.

A worker, in an embodiment, is any suitable computing entity such as a blockchain node as described in greater detail elsewhere in the present disclosure. In an embodiment, a worker (e.g., a blockchain node) evaluates the function $f$ on input $\mathcal{X}$ and generates an output y and a proof π of the correctness of the output y that can be verified by other computing entities such as the client as described above and/or other nodes of the blockchain network. Proofs, which may also be referred to as arguments, can be verified faster than doing the actual computational—accordingly, computational overhead can be reduced (e.g., reducing power overhead and the cost associated with powering and running computing resources) by verifying the correctness of the proof instead of re-computing the function $f$ over input $\mathcal{X}$ to determine the correctness of the output generated by the worker described above. In zero-knowledge verifiable computations, the worker provides an attestation to the client that the worker knows an input with a particular property.

An efficient variant of a zero-knowledge proof of knowledge is zk-SNARK (Succinct Non-interactive ARgument of Knowledge). In an embodiment, all pairings-based zk-SNARKs include a process where the worker computes a number of group elements using generic group operations and the verifier checks the proof using a number of pairing product equations. In an embodiment, the linear interactive proof works over a finite field and the worker's and verifier's message include, encode, reference, or otherwise include information usable to determine vectors of field elements.

In an embodiment, systems and methods described herein allow miners (e.g., nodes) of a blockchain to perform a computation (e.g., evaluation of function $f$ on input $\mathcal{X}$) once and generate a proof that can be used to verify correctness of the output, wherein evaluating correctness of the proof is computationally less expensive than evaluating the function. In this context, the cost (i.e., how expensive) of operations and tasks may refer to the computational complexity of performing the operation or task. In an embodiment, computational complexity refers to the average computational cost or the worst-case computational cost of performing the sorting algorithm—for example, a heapsort algorithm and a quicksort algorithm both have an average computational cost of O(n log n), but quicksort has a worst-case computational cost of O($n^2$), whereas heapsort has a worst-case computation cost of O(n log n). In an embodiment, the average computational cost and/or the worst-case computational cost of evaluating the function $f$ on input $\mathcal{X}$ is worse than that of evaluating correctness of the proof. Accordingly, the use of systems and methods described herein are highly advantageous and, may, for example, allow for more computationally expensive contracts to be run, as such contacts would not increase the time required to validate the blockchain proportionally. Further advantages may include reduction in power consumption of verifier systems, thereby improving the efficiency of verifier computer systems and reducing the energy costs associated with running such verifier computer systems in evaluating correctness of proofs.

In an embodiment, a verification key $V_K$ or portions thereof can be extracted from public parameters generated in a setup phase of a zero-knowledge protocol and used together with a proof π, and the input/output data to verify the alleged proof of correctness computation provided by a worker. For example, as described in greater detail above and below, systems and methods that allow a locking script secures the verification key $V_K$ from alteration and checks the validity of the proof π, allowing the execution of a zero-knowledge protocol on blockchain during transaction validation. Accordingly, the present disclosure presents systems and methods to execute the verification phase using blockchain scripts (e.g., in a Bitcoin-based network) for storing the elements used in the verification of the computation.

Figure 3:
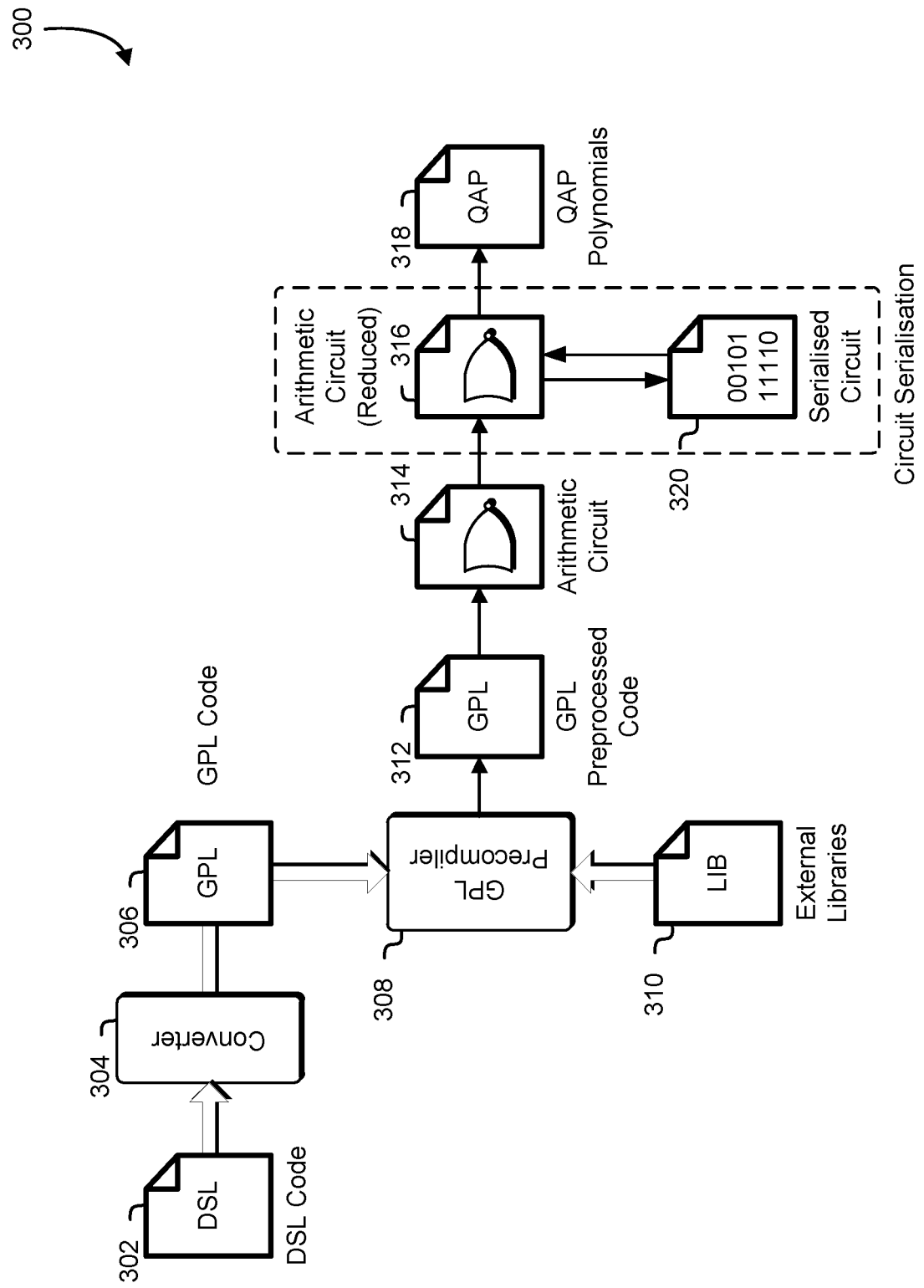
FIG. 3 illustrates an example of the workflow from domain-specific language (DSL) code to a quadratic arithmetic program (QAP) in accordance with an embodiment of the present disclosure.

FIG. 3 illustrates an example 300 of the workflow from domain-specific language (DSL) code to a quadratic arithmetic program (QAP) in accordance with an embodiment of the present disclosure. Specifically, FIG. 3 depicts DSL code 302 that is converted by a converter 304 into GPL code 306. A GPL precompiler 308 (also known as a pre-processor) incorporates external libraries 310 referenced by the GPL code 306 to produce GPL pre-processed code 312. The GPL pre-processed code 312 is transformed into an arithmetic circuit 314, which is optimised to produce a reduced arithmetic circuit 316 that is compressed to a produce a serialised circuit 320 from which QAP polynomials 318 are derived.

In an embodiment, the domain-specific language (DSL) code 302 is an application written in a formal language having precise semantics. In embodiments, the DSL code 302 includes a set of conditions, and the outcome of the DSL code 302 depends on fulfilment of the set of conditions. An example of an application (e.g., smart contract) is an insurance contract that takes, as input, a premium of an insuree and potential compensation to the insuree by an insurer. In the event the insuree suffers a loss (e.g., fulfilment of a first condition) during the term of the smart contract, execution of the smart contract distributes the premium to the insurer and distributes the compensation for the loss to the insuree. On the other hand, in the event the insuree does not suffer a loss during the term of the smart contract, execution of the smart contract distributes the premium to the insurer and returns the potential compensation to the insurer.

In an embodiment, the converter 304 is a software program that, as a result of execution, receives a set of conditions, such as the DSL code 302, written in a DSL and translates the DSL code into GPL source code, such as the GPL code 306. In an embodiment, the GPL code 306 is a GPL program, such as a C++ program, that contains the code defined in the DSL code 302. In some examples, a general-purpose programming language or "general-purpose language" (GPL), in contrast to a DSL, is broadly applicable. Examples of general-purpose programming languages include Ada, ALGOL, Assembly language, BASIC, Boo, C, C++, C #, Clojure, COBOL, Crystal, D, Dart, Elixir, Erlang, F #, Fortran, Go, Harbour, Haskell, Idris, Java, JavaScript, Julia, Lisp, Lua, Modula-2, NPL, Oberon, Objective-C, Pascal, Perl, PHP, Pike, PL/I, Python, Ring, RPG, Ruby, Rust, Scala, Simula, Swift, and Tcl. C++, which may be referred to in embodiments of the present disclosure, is a general-purpose programming language with imperative, object-oriented and general programming features, while also providing facilities for low-level memory manipulation. It should be noted in the context of FIG. 3, that "code" may alternately refer to executable code (e.g., object code), source code, both, either, or combinations thereof based on the context in which described.

In an embodiment, the GPL precompiler 308 is a computer-executable program that processes the GPL code 306 and the required external libraries 310 to produce the stand-alone GPL pre-processed code 312. In embodiments, the GPL precompiler 308 evaluates constant expressions and registers symbols found in the GPL code 306.

In an embodiment, the external libraries 310 are collections of pre-written subroutines, functions, classes, containers, values, and/or variable types utilised by the GPL code 306 by invocation. For example, by invoking the external libraries 310, the GPL code 306 gains the functionality of that library without having to implement the functionality itself.

In an embodiment, the GPL pre-processed code 312 includes a set of expressions and operators. The operators may include arithmetic operators (e.g., addition (+), multiplication (*), etc.), comparison operators (e.g., less than (<), equality (==), greater than or equal to (>=) etc.), conditional statements (e.g., if-then (?, :)), or logic operators (e.g., AND (&&), OR (||), NOT (!), XOR (⊕), etc.). In some embodiments, the main function is produced to have a predefined name and format.

In an embodiment, the arithmetic circuit 314 is a DAG over a set of variables. In an embodiment, every node of the DAG with an in-degree of zero is an input gate representing a variable (e.g., $x_i$), and every other node of the DAG is a sum gate (+) or a product gate (×). In embodiments, every gate (node) has an out-degree of one, so the underlying graph is a directed tree. In embodiments, the arithmetic circuit 314 has two measures of complexity: size and depth. In some examples, a "size" of an arithmetic circuit is based on a number of gates within the arithmetic circuit 314. In some examples, "depth" of the arithmetic circuit is based on the length of the longest directed path within the arithmetic circuit.

In an embodiment, the reduced arithmetic circuit 316 is a reduced or minimised directed acyclical graph (DAG) that can be used to determine the outcome of a set of conditions, such as those specified in the DSL code 302, given a set of inputs. In some embodiments the reduced arithmetic circuit 316 is a minimised (i.e., reduced to the smallest degree) arithmetic circuit. In some embodiments, the most optimal arithmetic circuit may not necessarily be the smallest arithmetic circuit (e.g., certain larger arithmetic circuit may be evaluated more quickly than larger arithmetic circuits depending on the number and types of arithmetic operations in the circuit), and in such embodiments the reduced arithmetic circuit 316 is an optimised (e.g., for maximum speed, less memory usage, most efficient processor utilisation, etc.), but not necessarily minimised, arithmetic circuit. The reduced arithmetic circuit 316 may be generated using techniques described in UK patent application number GB 1718505.9.

An arithmetic circuit such as the reduced arithmetic circuit 316 may be compressed according to techniques described herein to generate a serialised circuit 320. The serialised circuit 320 may be used in case of code templates or standard applications that need to be stored and retrieved. By utilizing a serialised circuit 320, parties can obviate the need to create an instance of the circuit from a GPL every time a new application is created, thereby improving the efficiency of a protocol in which clients and provers re-use certain code templates or portions thereof. The serialised circuit 320 may be generated using entropy coding on the most frequent elements in the data structure, such as the arithmetic operator types. Instructions for de-serialisation and de-compression (e.g., a codebook for mapping serialised codes to source symbols) may be embedded in a serialised bit stream that enables a recipient of a serialised circuit to reconstruct the source circuit.

In an embodiment, the QAP polynomials 318 are one or more expressions comprising variables and coefficients expressed in a mathematical formula that provides a complete description of the original arithmetic circuit (e.g., arithmetic circuit 314 of FIG. 3). In embodiments, the polynomials of the QAP polynomials are defined in terms of their evaluations at the roots of the arithmetic circuit such as described in Gennaro, R. et al., *Quadratic Span Programs and Succinct NIZKs without PCPs* (2013). In embodiments, the QAP polynomials are encoded into a locking script of a blockchain transaction as a representation of the smart contract. In embodiments, the locking script, upon execution, receives a set of parameter values (e.g., as a result of execution of a locking script), which are input as variables into the QAP polynomials to cause the result of the smart contract to be determined.

In embodiments, the GPL precompiler 308 produces the GPL pre-processed code 312, which may be an arithmetic circuit comprised of arithmetic gates. Note, however, that complex arithmetic circuits also embed logic submodules because of conditional and flow control statements.

Figure 4:
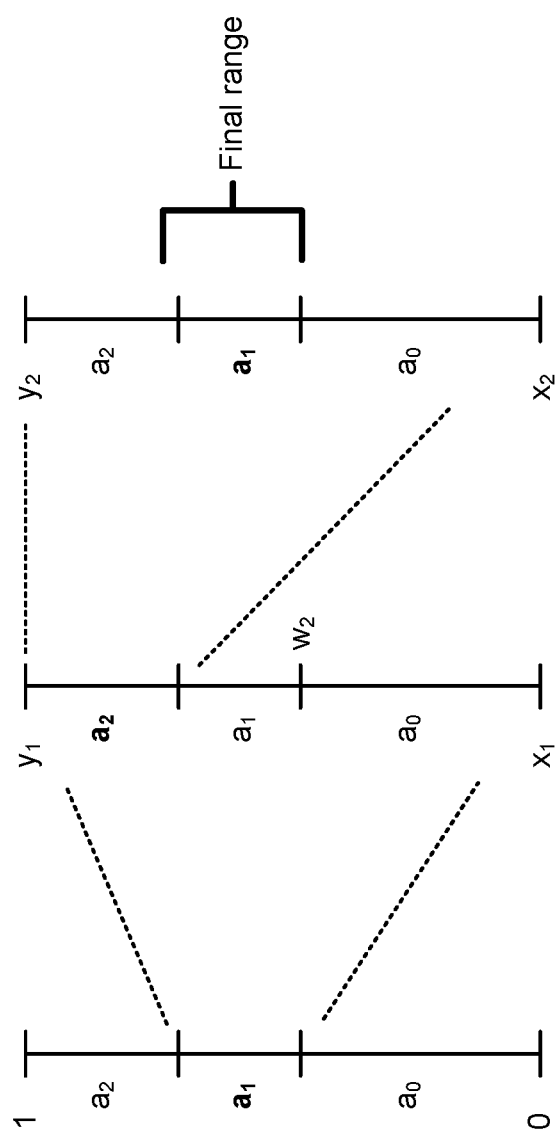
FIG. 4 illustrates a diagram visualising an arithmetic coding of a sequence of symbols, in accordance with an embodiment of the present disclosure.

FIG. 4 illustrates a diagram 400 visualising an arithmetic coding of a sequence of symbols, in accordance with an embodiment of the present disclosure. In an embodiment, a process for generating an arithmetic coding for a sequence of symbols can be performed in connection with the diagram illustrated in FIG. 4. Arithmetic coding is a type of entropy encoding used in lossless data compression. A set of symbols is usually represented using a fixed number of bits per symbol, as in the ASCII code, and frequently used symbols may be stored with fewer bits. Unlike Huffman coding, arithmetic coding encodes the entire message into an arbitrary-precision range [x, y), such as a range between zero and one ($0 \leq x < y \leq 1$).

For example, FIG. 4 illustrates an arithmetic coding of symbol sequence $\{a_1, a_2, a_1\}$ which can be encoded using within an arbitrary-precision range. In an embodiment, symbols are encoded in a range between 0 and 1 (e.g., inclusive and/or exclusive of endpoints). In an embodiment, symbols are encoded in a range between 0 and $2^n$, inclusive and/or exclusive of endpoints. In accordance with FIG. 4, an example includes a set of value ranges that correspond to the first symbol in the sequence. For example, values in the range $[0, x_1)$ correspond to the first symbol being $a_0$, values in the range $[x_1, y_1)$ correspond to the first symbol being $a_1$, and values in the range $[y_1, 1)$ correspond to the first symbol being $a_2$. In an embodiment, the each of the value ranges can be further divided to correspond to the second symbol in the symbol sequence. For example, and in accordance with FIG.

4, let $x_1 < w_2 < x_2 < y_2 = y_1$. It then follows for this example that the following two-symbol sequence can be encoded using the following value ranges:

| | |
|---|---|
| $a_1 a_0$ | $[x_1, w_2)$ |
| $a_1 a_1$ | $[w_2, x_2)$ |
| $a_1 a_2$ | $[x_2, y_1)$ |

In various embodiments, arithmetic coders can produce near-optimal output for any given set of symbols $a_i$ from an alphabet A with size n with probabilities $p_i$ wherein the optimal value is $-\log_2 p_i$. A data model can be defined by predicting what patterns will be found in the symbols of the message: an accurate prediction guarantees a near-optimal output. In an embodiment, adaptive models change their estimation of the current probability of a symbol based on the previous symbols. In an embodiment, the decoder utilises the same model as the encoder.

Encoding and decoding of symbols can be performed using various techniques described in greater detail hereinbelow: at each step j of the encoding process, a new symbol can be encoded using the current interval $[x_j, y_j]$ (as noted elsewhere in this disclosure, embodiments that are exclusive and/or inclusive of endpoints are contemplated within the scope of this disclosure) and the current probabilities $p^j$. In accordance with various embodiments, $p^j(a_i)$ is defined as the symbol probability of $a_i$ at step j. The generic notation $p_i$ is valid, in an embodiment, if and only if adaptive models are not used. The encoder divides the current interval into sub-intervals, each representing a fraction of the current interval proportional to the probability of that symbol. The sub-interval of the incoming symbol a with probability $p^j(a_i)$ becomes the updated interval $[x_{j+1}, y_{j+1}]$:

$$x_{j+1} = x_j + (y_j - x_j) \sum_{k=0}^{i-1} p^j(a_k)$$

$$y_{j+1} = x_{j+1} + (y_j - x_j) p^j(a_i)$$

Once all symbols of a sequence are encoded, the resulting interval corresponds to (e.g., unambiguously identifies) the entire sequence of symbols. As shown in FIG. 4, values that fall within the interval marked as "final range" (e.g., inclusive and/or exclusive of endpoints). For example, the following table may, in an embodiment, reflect sequences of symbols and the corresponding ranges representing said sequences:

| | |
|---|---|
| $a_0 \ldots$ | 0-0.5 |
| $a_1 a_0 \ldots$ | 0.5-0.75 |

-continued

| | |
|---|---|
| $a_1 a_1 \ldots$ | 0.75-0.85 |
| $a_1 a_2 a_0$ | 0-0.5 |
| $a_1 a_2 a_1$ | 0-0.5 |
| $a_1 a_2 a_2$ | 0-0.8 |
| $a_2 \ldots$ | 0.7-1 |

Furthermore, it should be noted that the intervals or value ranges illustrated in FIG. 4 are not necessarily to scale, nor does FIG. 4 imply the proportionality of certain intervals to other intervals. In an embodiment, the intervals are proportional or substantially proportional (e.g., to a certain precision threshold as a result of rounding values) to the probability of a symbol occurring. In an embodiment, the probability of a symbol at a step j+1 is dependent on the preceding symbol at step j. In an embodiment, the probability of a symbol occurring at a step j has properties of being memoryless, wherein the distribution of a symbol occurring at j+1 is not dependent on the values of any preceding symbols.

In an embodiment, a symbol sequence can be reconstructed knowing the interval (or any fraction that lies in the interval) and the probabilities model. If the stream is not internally terminated, for instance using an EOS (end of stream) symbol $a_{EOS}$ with its own probability $p_{EOS}$, then an external mechanism may be utilised to interrupt the decoding process. In some cases, different equally-short decimal fractions can be used to represent the same interval. Therefore, the binary representation with less bits can be selected to maximise the compression factor, in accordance with an embodiment. For instance, two fractions in the range [0.65, 0.67) can be represented with vastly different number of bits, thereby affecting the compression factor of the sequence:

| Decimal Fraction | Binary Fraction |
|---|---|
| 0.65 | 0.101001100110011001100110011001100110011 . . . |
| 0.6666259765625 | 0.1010101010101 |

Accordingly, in an embodiment, techniques are utilised to reduce (or minimise) the number of bits used to encode a sequence of symbols. In embodiments where an integer number of bits are used in the binary encoding, an arithmetic encoder can introduce a maximum overhead of 1 bit over the size of the compressed message. Arithmetic coders may operate at a fixed limit of precision $\psi$, which the decoder is able to match, and round the fraction to the nearest equivalent at that precision. For instance, three symbols with equal probability $p=\frac{1}{3}$ require infinite precision to correctly represent the three intervals in [0, 1). IN an embodiment, a precision value can be selected, for example $\psi=8$ bit, and be used to compute the binary ranges at that precision as shown:

| Symbol | Probability | Real Interval | Binary Interval ($\psi$ = 8) | Coded Range |
|---|---|---|---|---|
| $a_0$ | 1/3 | [0, 0.3333333333 . . .) | [0.00000000, 0.01010101) | 00000000-01010100 |
| $a_1$ | 1/3 | [0.3333 . . . , 0.6666 . . .) | [0.01010101, 0.10101011) | 01010101-10101010 |
| $a_2$ | 1/3 | [0.6666666666 . . . , 1) | [0.10101011, 1.00000000) | 10101011-11111111 |

In an embodiment, when one or more digits are shared between the two limits of the current coded range, those digits are appended to the output stream and discarded. The remaining digits in the coded range are shifted to the left while new digits are added to the right: ones for the high limit and zeroes for the low limit. Thus, the system keeps working on w bits of precision by expelling the bits that no longer contribute to the precision of the calculation.

With respect to upper bound for compression, given a message of size L and symbol frequencies $f(a_j)$ for an alphabet A, an encoded fraction with infinite precision can be represented in $L_C$ bits:

$$L_C(A) = -\log_2 \prod_{j=1}^{n} \frac{f(a_j)^{f(a_j)}}{L} = L\log_2(L) - \sum_{j=1}^{n} f(a_j)\log_2 f(a_j)$$

Dividing $L_C$ by L gives the self-entropy of the message, i.e. arithmetic coding encodes asymptotically close to the entropy:

$$\frac{L_C(A)}{L} = \log_2(L) - \sum_{j=1}^{n} p_j \log_2 p_j$$

Therefore, arithmetic coding can encode substantially close to the entropy of a probabilistic model whose symbol probabilities are the same as those of the input message.

It should be noted that arithmetic coding does not compress one symbol at a time, therefore it can get arbitrarily close to the entropy limit. By contrast, Huffman coding does not reach the entropy limit unless all symbol probabilities are powers of two. Consider the following example: two symbols $\{0, 1\}$ with low entropy ($p_0 = 0.95$, $p_1 = 0.05$). While Huffman encoding assigns 1 bit to each value, resulting in a code of the same length as the input, arithmetic coding approaches the optimal compression ratio:

$$\frac{L_C(\{0,1\})}{L} = \log_2(L) - p_0 \log_2(p_0) - p_1 \log_2(p_1) = 0.714$$

Figure 5:
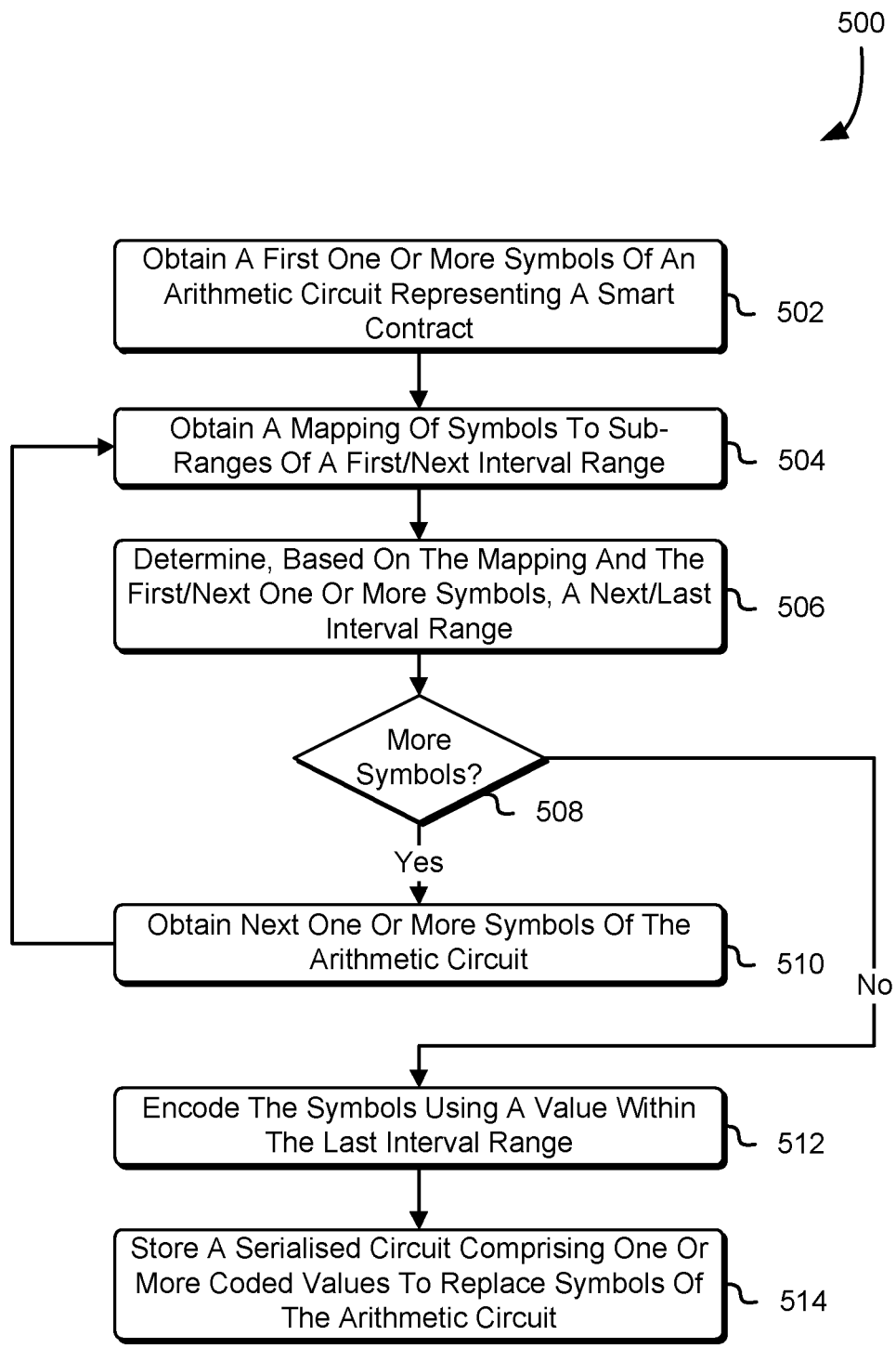
FIG. 5 shows an illustrative example of a process for using an arithmetic coding to compress an arithmetic circuit, in accordance with an embodiment of the present disclosure.

FIG. 5 shows an illustrative example of a process 500 for using an arithmetic coding to compress an arithmetic circuit, in accordance with an embodiment of the present disclosure. Some or all of the process 500 (or any other processes described herein, or variations and/or combinations thereof) may be performed in accordance with techniques described in connection with FIG. 4. The process 500 is illustrative of steps that can be implemented to generate a serialised circuit from an arithmetic circuit. As a result of serialising an arithmetic circuit using arithmetic coding techniques described herein, a compressed representation of the arithmetic circuit can be stored in place of the arithmetic circuit—for example, in an embodiment, a serialised circuit is broadcast to nodes of a blockchain network in place of the arithmetic circuit, thereby reducing the data storage requirements for nodes (e.g., those that retain a copy of the blockchain ledger) of the blockchain network.

In an embodiment, a system obtains an arithmetic circuit (e.g., represented as lines code in a data file) and parses the arithmetic circuit to identify operators and wire identifiers that are inputs and/or outputs of the operators. In an embodiment, operators and identifiers are pushed to and stored in different data structures. The process 500 illustrated in FIG. 5 may be suitable for encoding the different types of circuit data as described above. In an embodiment, the process 500 is performed separately for operators and identifiers (e.g., input identifiers).

In an embodiment, the system obtains 502 a first one or more symbols of the arithmetic circuit representing a smart contract. In some cases, the process involves selecting one symbol at a time and mapping the individual symbol to a range, whereas in other cases, multiple symbols are collected and the multiple symbols are collectively mapped to a specific interval range. In an embodiment, the symbols are all of a particular type (e.g., all operators, all input wires).

In an embodiment, the system obtains 504 a mapping of symbols to sub-ranges of an interval range. The initial interval range may span a global minimum and global maximum values (e.g., all coded symbols fall within the global min/max values). Unless noted otherwise, endpoints described in connection with FIG. 5 herein above and below may be inclusive and/or exclusive (e.g., the range may be inclusive of the lower bound and exclusive of the upper bound). In an embodiment, the global minimum is 0 (inclusive) and the global maximum is 1 (exclusive) so that the entire range of values can be represented by a binary fraction having a value less than 1. The mapping may refer to a mapping table that divides the initial interval range into a set of non-overlapping sub-ranges such that the sub-ranges collectively cover the entire initial interval range. Each of the sub-ranges, in an embodiment, is mapped to a symbol or set of symbols. In an embodiment, the system determines 506, based on the mapping and the first one or more symbols, a next interval range. The system, in an embodiment, makes the determination by finding the mapping table entry that corresponds to the first one or more symbols and selects the sub-range corresponding to the first one or more symbols to be the next interval range. In an embodiment, if the mapping fails (e.g., there is no mapping table entry for the first one or more symbols) the process terminates prematurely with an error. For example, if the global range is [0, 1), then the following mapping table may exist for a set of symbols:

| | | |
|---|---|---|
| $a_1$ | [0, 0.3) | 30% |
| $a_2$ | [0.3, 0.8) | 50% |
| $a_3$ | [0.8, 1) | 20% |

In an embodiment, the system, after having determined a sub-range for the first one or more symbols, determines whether 508 there are more symbols to encode. In an embodiment, the determination is made by determining whether there are additional symbols in a data structure (e.g., after the first one or more symbols are popped from the data structure). If there are additional symbols, the system, in an embodiment, obtains the mapping of symbols to sub-ranges of the previously determined sub-range. In an embodiment, the sub-ranges are proportionally the same as previous ranges, such as in the following case:

| | | |
|---|---|---|
| $a_2 a_1$ | [0.3, 0.45) | 30% |
| $a_2 a_2$ | [0.45, 0.7) | 50% |
| $a_2 a_3$ | [0.7, 0.8) | 20% |

In an embodiment, the system uses this second mapping to determine, for a second set of one or more symbols, an interval range that corresponds to the so-far processed symbols. In an embodiment, these steps are repeated until no more symbols are left (data structure storing the symbols is empty, end of file reached, etc.) such that the last sub-range is retained and used to code a value. For example, continuing with the previous example, if the entire set of symbols is $a_2 a_3$, then the last interval range is [0.7, 0.8). Accordingly, in this example, any binary decimal value between 0.7 (inclusive) and 0.8 (exclusive) can be used to represent the symbols $a_2 a_3$.

Once a last interval range is obtained, the system encodes 512 the symbols using a value within the last interval range. Any value within the interval range is suitable for encoding the symbols—for example, continuing with the previous example, examples of valid values for encoding $a_2 a_3$ include: 0.7, 0.75, and $0.79\overline{79}$. Examples of invalid values for encoding a2a3 include: $0.69\overline{69}$, 0.8. As there may be multiple suitable values for encoding a set of symbols, a binary representation with less bits can be selected to maximise the compression factor.

In an embodiment, operators and/or wire identifiers (or a portion thereof) may be serialised as described in accordance with FIG. 5. The resulting serialised circuit may be stored 514 in place of the arithmetic circuit—for example, on a blockchain ledger—thereby reducing the storage requirements for encoding the represented smart contract.

Figure 6:
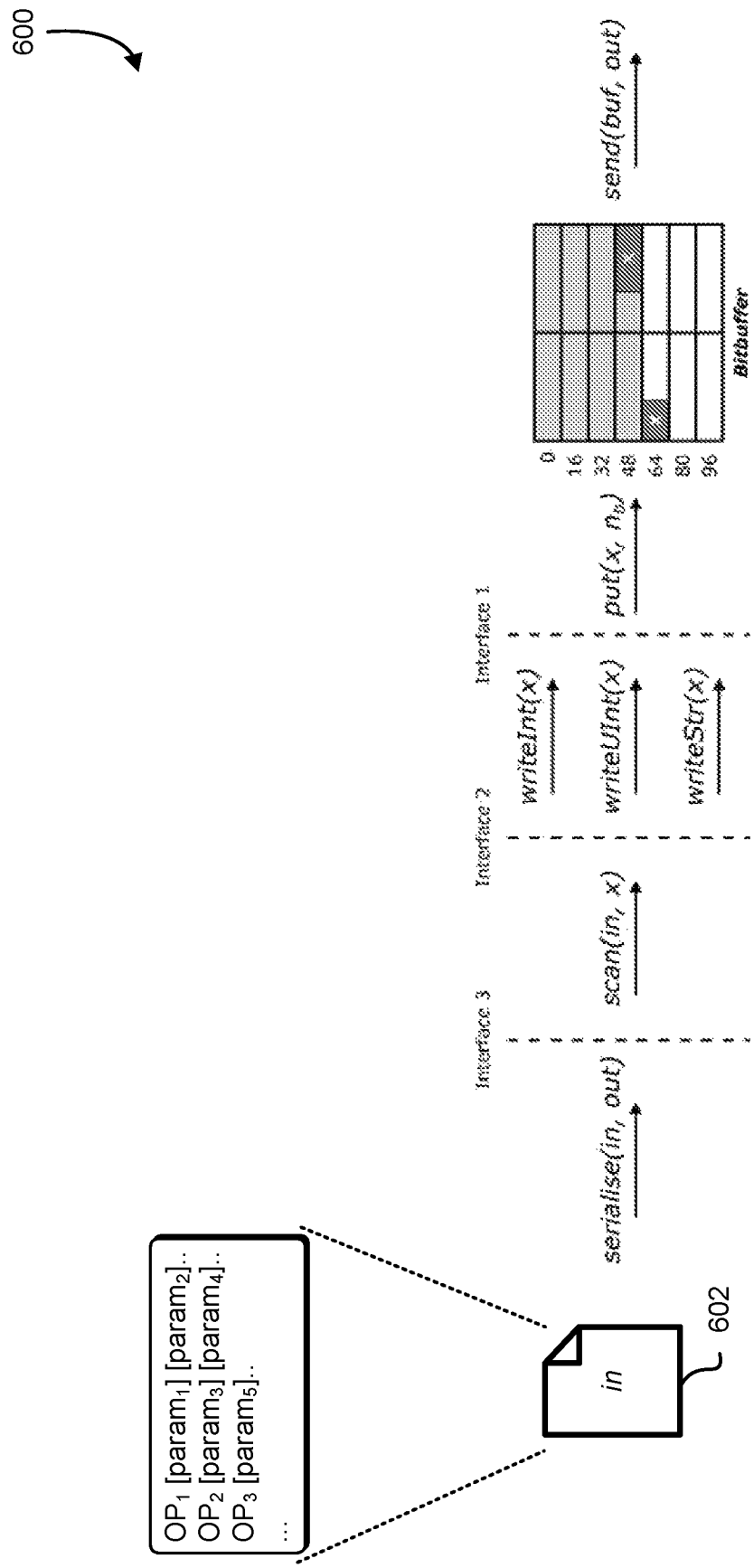
FIG. 6, in an embodiment, illustrates a diagram in which various solutions to the serialisation of arithmetic circuits based on compression properties of arithmetic coding may be implemented, according to at least one embodiment.

FIG. 6, in an embodiment, illustrates a diagram 600 in which various solutions to the serialisation of arithmetic circuits based on compression properties of arithmetic coding may be implemented, according to at least one embodiment. In an embodiment, the serialisation process is managed by a buffer providing bit-wise operations, referred to in FIG. 6 as a bitbuffer. In an embodiment, the bitbuffer temporarily stores the data before being transferred to a permanent storage support or sent over the network. As shown in FIG. 6, the buffer is accessible using (at least) the following methods: a put( ) function that inserts input data x into the buffer. In an embodiment, x is stored using $n_b$ bits; a send( ) function that flushes the buffer and transfers the data to an output stream out.

One or more interfaces that serve as abstraction layers may be provided to typed operations. In an embodiment, the low-level method put( ) can be called by different higher-level methods such as writeInt( ), writeUint( ) and writeStr( ) which can be utilised to write (e.g., to the buffer), integers, unsigned integers, and strings, respectively.

In an embodiment, a third abstraction layer is provided by a function such as scan( ) which reads data from an input (e.g., an input file 602 illustrated in FIG. 6) line-by-line and calls the underlying methods for writing typed data. In an embodiment, the scan( ) function illustrated in FIG. 6 corresponds to a routine that, if invoked, checks that each command in the file can be mapped to one of the underlying methods. In an embodiment, an error in the mapping—for example, as a result of detecting an unrecognized command, incorrect signature format, incorrect (e.g., deprecated) function version, etc.—causes the failure of the entire coding process.

In an embodiment, the highest abstraction layer, a serialise( ) function reads from an input file comprising the circuit information and sends the compressed information to an output stream. In an embodiment, the output stream is a file or a network resource.

In an embodiment, the lines of a file comprising a circuit have the following format, wherein P is the number of parameters for the operator OP. In an embodiment, an operator requires a specific number of parameters. In an embodiment, parameters can be classified as in-parameters (input parameters), out-parameters (output parameters), inout-parameters (parameters that supply input values to an operation and are used as store results of the operation), and more. In an embodiment, separate data structures are used for the compression of operators and parameters. In an embodiment, different compression techniques are used for different data structures. The data structures, in an embodiment, may be implemented using any suitable data such as a queue, stack, vector, and more. In an embodiment, the operators in the operator queue are required to have a fixed number of parameters and/or fixed size of parameters (e.g., data blobs of variable length are not supported). For example, an "ADD" operation stored on the data structure may require exactly two input parameters and one output parameter. It should be noted that the operations stored in the queue may be different from those at higher levels of abstraction—for example, and generally speaking, an addition operation can be performed against an arbitrary number of input parameters (e.g., a+b+c+ . . . ). In an embodiment, the data structure has multiple variants of an operation to accommodate different function signatures—for example, the data structure may support an "ADD2" operation that supports two inputs and an output representing the sum of the two inputs, an "ADD3" operation that supports three inputs and an output parameter for the sum of the three inputs, and so on. Accordingly, in an embodiment, the summation of an arbitrary number of inputs can be chained together using multiple addition operations having a fixed number of inputs.

In an embodiment, data fields having dynamic (e.g., variable) size can be embedded in a serialised packet. As an illustrative example, consider the case where 4 blocks of compressed data [$data_1$, $data_2$, $data_3$, $data_4$] with the same size (16 bit) are to be serialised. In an embodiment, blocks of data can be compressed using the following encoding scheme: a first field with a constant size includes the size (e.g., in bits) of the field reserved to the number of data packets in the payload; a second field with constant size (e.g., same size as or different size from the first field) includes the size in bits of the fields reserved to the data packets in the payload; a third field including the number of data packets in the payload; and remaining fields including the data packets. This is merely one illustrative example for how to embed dynamic data fields. In an embodiment, a first data field encodes the size of a first data structure that follows the first data field, wherein the data structure can, in turn, comprise a second data field that encodes the size of a second data structure that follows the second data field, and so on, in a nested and/or sequential pattern.

In an embodiment, the header of a serialised circuit comprises one or more encoded fields, such as those described in detail hereinbelow. In an embodiment, a version field provides information as to how to interpret and/or build the rest of the header and can be of a fixed size (e.g., 1 byte). In an embodiment, the header includes a parameter M that indicates the number of symbols for operations. In an embodiment, this parameter is encoded using a fixed number of bits that is determined based on the maximum number of operators that is supported by the serialised circuit. In an embodiment, the number of input wires (IN), number of output wires (OUT), encoded size for wire identifiers ($n_w$), and encoded size for parameters ($n_{params}$) are encoded, such as by using a hard-coded number of bits. In an embodiment, the total number of wires N has an encoded size of $n_w$. It should be noted that the header does not necessarily need to be located at the beginning or head of a serialised circuit data file. In an embodiment, the header merely needs to be located at some point in the serialised circuit before the data that the header information relates to—for example, if the header includes a parameter for the total number of wires N, in an embodiment, the header information N is encoded at any suitable point in the serialised circuit such that it is read before the data encoding the wire identifiers.

In an embodiment, the header includes an embedded dictionary. In an embodiment, the maximum encoded size for the symbols of a Huffman encoding are added first, then each pair (symbol size, symbol) are added using the maximum encoding size for the first element of the pair. In an embodiment where arithmetic encoding is utilised, $n_{params}$ is an optional parameter of the header (e.g., can be omitted). In an embodiment, individual symbol probabilities can be directly encoded (using an encoding size $n_{prob}$) or a probability scheme can be provided and the multiplicative coefficients can be used to represent the whole set. For example, consider the case in which 4 symbols are used with the following probabilities: $p_1=0.1$, $p_2=0.4$, $p_3=0.1$, $p_4=0.4$, then, multiplicative coefficients can be used to represent the whole set [1, 4, 1, 4]. In an embodiment, these coefficients are individually encoded (e.g., using an encoded size $n_{coeff}$) or represented as scheme templates with a unique identifier (e.g., using an encoded size $n_{pid}$). In an embodiment, the header also encodes $n_{prob}$ and/or a table mapping symbols to identifiers.

In an embodiment, the arithmetic coding uses a range of values to represent a sequence of operators according to the probabilities encoded in the header. In an embodiment, the precision of the encoded range can be computed as described elsewhere in this disclosure, such as in connection with the descriptions associated with FIG. 4. In an embodiment, such as those using Huffman encoding, each compressed symbol corresponding to an operator is sequentially added to the payload.

In an embodiment, wire identifiers are each sequentially added to the payload, such as in the case where Huffman encoding is utilised. In an embodiment, different strategies can be utilised for encoding wire identifiers using arithmetic encodings, such as one or more of: sequential coding (e.g., as per Huffman coding), arithmetic coding (e.g., as per operators), aggregation of identifiers (e.g., as described in greater detail below in connection with FIG. 8).

Figure 7:
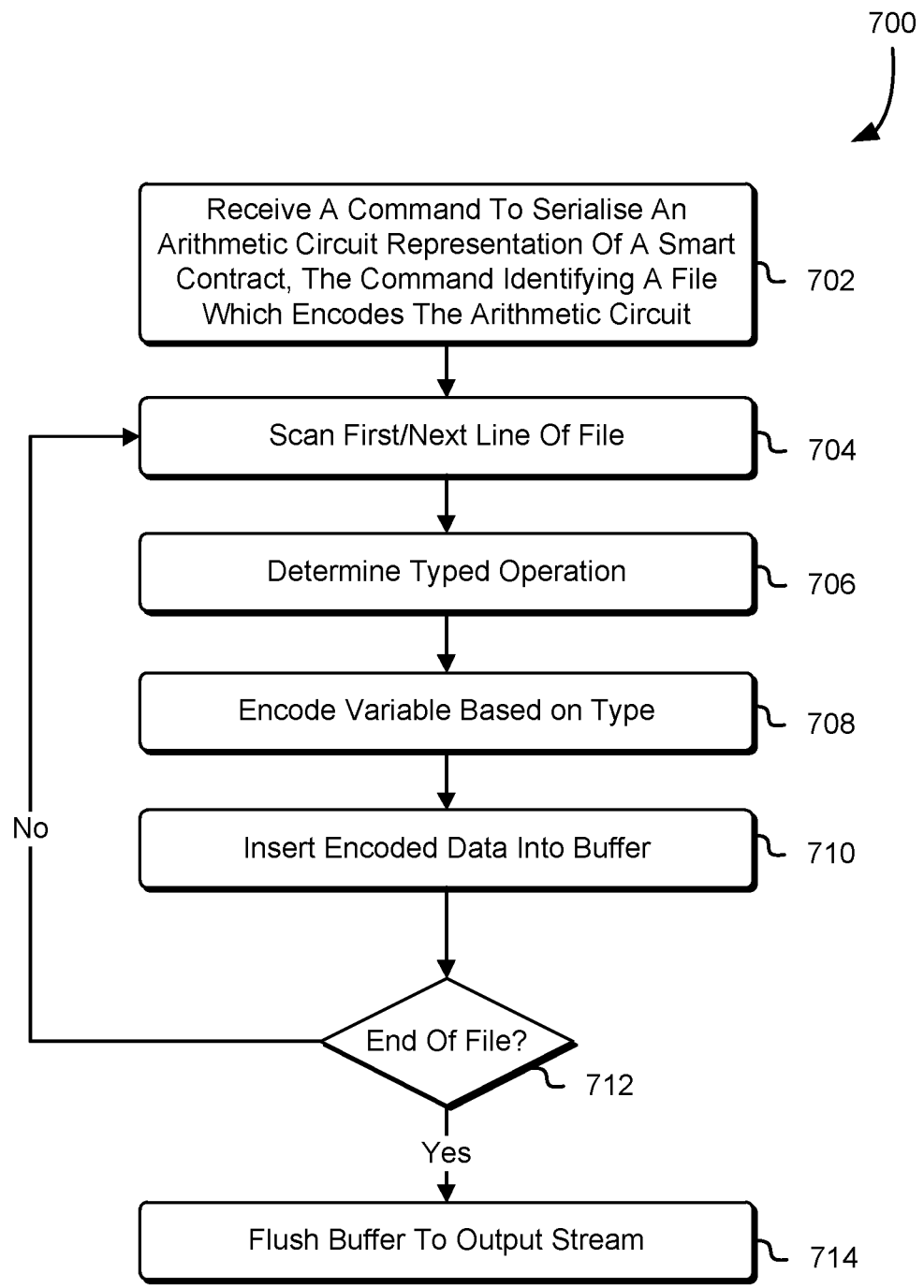
FIG. 7 shows an illustrative example of a process for using a buffer to manage serialisation of an arithmetic circuit in accordance with an embodiment.

FIG. 7 shows an illustrative example of a process 700 for using a buffer to manage serialisation of an arithmetic circuit in accordance with an embodiment. Some or all of the process 700 (or any other processes described herein, or variations and/or combinations thereof) may be performed in accordance with techniques described in connection with FIGS. 5 and 6.

In an embodiment, the serialisation process 700 is managed using a set of interfaces that provide layers of abstraction between different operations and types of operations. In an embodiment, at a first abstraction layer, a computer system performing the process 700 receives 702 a command to serialise an arithmetic circuit that represents a smart contract. In an embodiment, the command is an application programming interface (API) command that includes a reference to a data file that includes the arithmetic circuit to serialise. In an embodiment, the data file is an uncompressed data file (e.g., not compressed using arithmetic coding techniques). In an embodiment, the command also identifies an output stream for storing the serialised result of the arithmetic circuit.

In an embodiment, a smart contract is written in domain-specific language (DSL) code having precise semantics—the smart contract, in an embodiment, includes a set of conditions and one or more outcomes whose fulfilment depends at least in part on evaluation of the set of conditions based on one or more inputs. In an embodiment, the DSL code is converted to general-purpose language (GPL) code. Non-limiting examples of genera-purpose languages include: Ada, ALGOL, Assembly language, BASIC, Boo, C, C++, C #, Clojure, COBOL, Crystal, D, Dart, Elixir, Erlang, F #, Fortran, Go, Harbour, Haskell, Idris, Java, JavaScript, Julia, Lisp, Lua, Modula-2, NPL, Oberon, Objective-C, Pascal, Perl, PHP, Pike, PL/I, Python, Ring, RPG, Ruby, Rust, Scala, Simula, Swift, and Tcl. In an embodiment, a GPL precompiler processes the GPL code using external libraries to produce a stand-alone GPL pre-processed smart contract. In an embodiment, the arithmetic circuit is built by representing symbols with wires connected to elementary arithmetic gates.

In an embodiment, the system scans 704 the first line of the input file including the arithmetic circuit. In an embodiment, each line of the input file that is read corresponds to a command, which may correspond to one or more executable instructions (e.g., assembly instructions). In an embodiment, scanning the file comprises obtaining a command from the first or next line of the file and mapping the command to an underlying method. In an embodiment, the system determines the mapping by determining 706 a typed operation associated with the command. In an embodiment, the different types of data supported include: integer, unsigned integer, and string (e.g., array of characters ending with a null terminator special character).

In an embodiment, depending on the specific settings of an encoder, different types of variables are encoded 708 using a different number of bits. The encoding techniques may be in accordance with those described in greater detail in connection with FIG. 5. For example, the encoding of header data, operator data, and wire identifier data can each utilise different techniques such as arithmetic coding techniques for data encoding. Different encoding techniques can be used for different typed operations. In an embodiment, once the data has been encoded, data is inserted into a buffer. In an embodiment, the command to insert 710 the data to a buffer is a command that writes a specific number of bits of data to an output stream. The system may then determine whether 712 the end of the file has been reached (e.g., by detecting whether a special end-of-file sequence of bits or characters has been reached). In an embodiment, if there are more commands of the file to be processed, the system sequentially scans through the file to obtain the second, third, fourth, etc. line of the file and processes them according to the steps 704-710 discussed above. These steps may be repeated until the end of the file is detected, at which point the system may flush 714 the buffer and transfer all the data to an output stream or file, thereby generating a serialised circuit.

Figure 8:
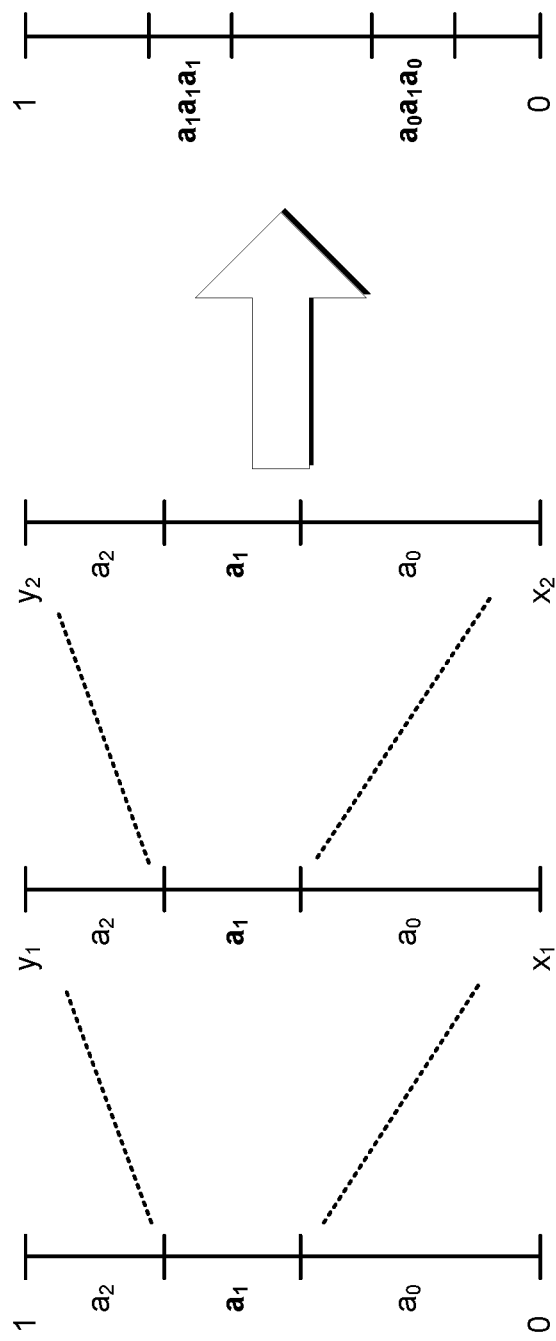
FIG. 8 illustrates a diagram visualising a multi-symbol representation of a sequence of symbols that exploits properties of a dictionary based on arithmetic circuits, in accordance with an embodiment.

FIG. 8 illustrates a diagram 800 visualising a multi-symbol representation of a sequence of symbols that exploits properties of a dictionary based on arithmetic circuits and can be utilised in connection with other compression techniques described herein to reduce the size of an arithmetic circuit that is stored on a computer system or computer network such as nodes of a Bitcoin network.

In an embodiment, the size of a dictionary is limited (e.g., due to constraints in available computing resources) and the occurrence of symbols are correlated (e.g., lacking probabilistic property of independence). Accordingly, in an embodiment, the arithmetic range for compression includes symbols which aggregate the functionality of individual primitives, such as is illustrated in FIG. 8.

As an illustrative example, consider the following circuit or portion of a circuit (e.g., sub-circuit), wherein the first two parameters of each operation are input identifiers and the last parameter is an output identifier:

ADD 4 5 6
ADD 1 6 7
ADD 1 7 8

The above addition operations, in an embodiment, can be compressed to the following form:

ADD3 3 4 5 1 1 8

In an embodiment, various factors affect the degree to which data can be compressed, such as whether and/or to what degree the dictionary size is limited (probability range fragmentation does not ease the optimisation of the binary representation of a fraction); whether primitives are individually encoded (probabilities ranges allocated to aggregated symbols); minimum number of aggregated symbols is provided (less aggregated symbols correlates to more efficient probability range allocation). An estimation of the compression performance, in an embodiment, can be determined based on the assumption that all arithmetic operations have the same number of inputs (e.g., a). In an embodiment, an aggregated symbol $OP_N$ built upon N primitive operators generates new bits for the compressed output stream at an average rate N times slower than the corresponding primitive operators. Moreover, N−1 input identifiers can be spared. If the initial circuit size was $size_{OPS} + size_{IDS}$ for operations and identifiers, then the optimal compression is given by:

$$\frac{1}{N} size_{OPS} + \frac{\alpha}{\alpha + 1} size_{IDS} + 1$$

The probability ranges for the aggregated symbols can be fixed or automatically adjusted depending on the previous symbols. In case of fixed probabilities, we define the following aggregated probability $P(s_1, s_2, \ldots s_\beta)$ for a sequence of symbols $\{s_1, s_2, \ldots s_\beta\}$:

$$P(s_1, s_2, \ldots, s_\beta) = \prod_{k=1}^{\beta} P(s_k)$$

It should be noted that β! (i.e. factorial of β) different permutations of β consecutive symbols are available—note that a sequence of symbols may contain the repetition of one or more symbols. Because of the commutative property of the multiplication, each permutation is characterised by the same aggregated symbol probability.

Figure 9:
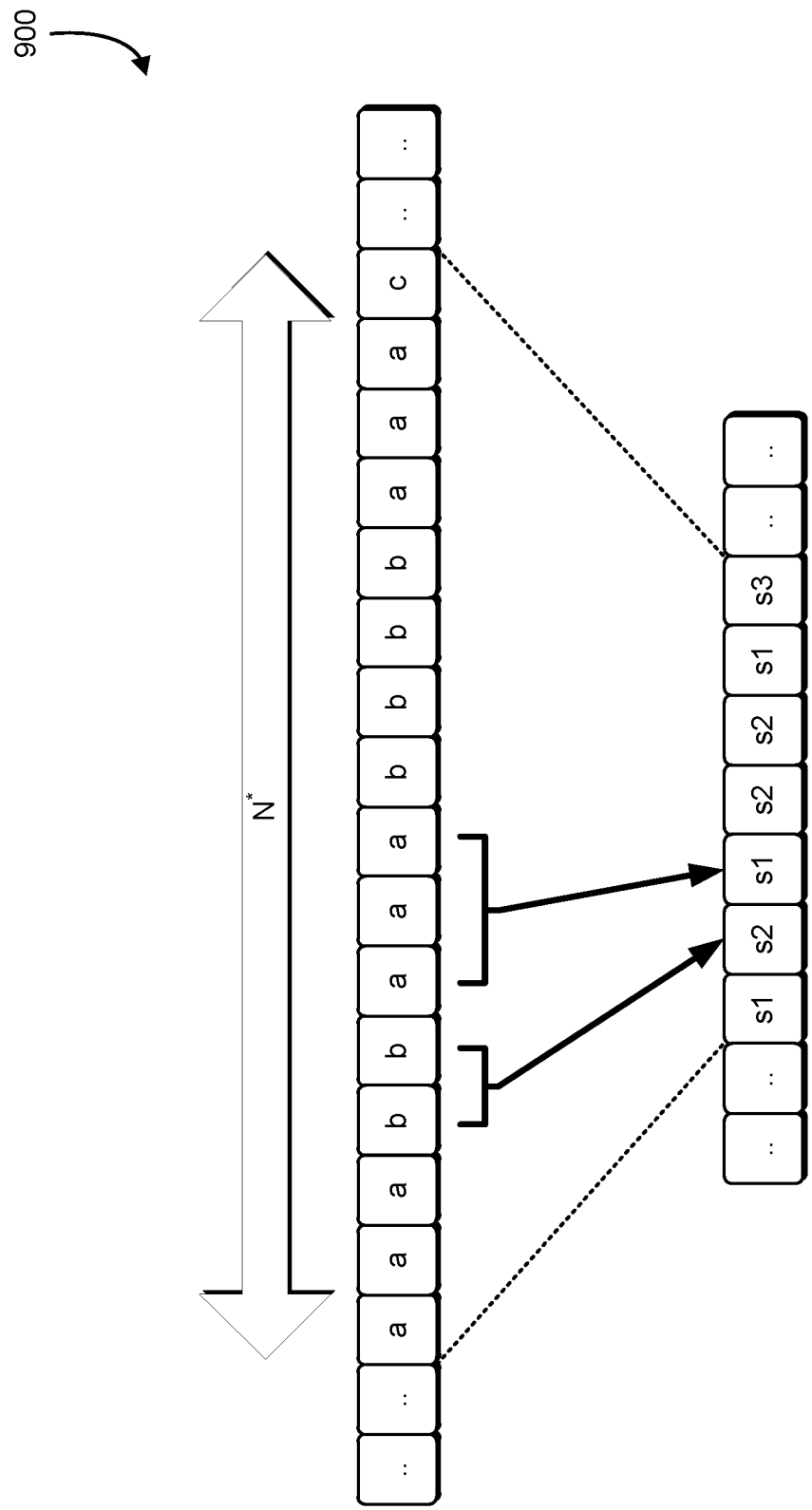
FIG. 9 illustrates a diagram of multi-symbol encoding, in accordance with an embodiment.

In an embodiment, the symbol depth β is dynamically modified during the encoding stage according to the contents of the input stream. In an embodiment, a number of emitted symbols N* is used to establish when a new range allocation is performed. In an embodiment, the multi-symbol ranges across two consecutive windows of N* emitted symbols can be different. Moreover, a different aggregate symbol depth $\beta_i$ (1≤i≤n*) can be defined for each of the n* multi-symbol ranges defined in the current window, as illustrated in FIG. 9. In an embodiment, N* is constant and/or is defined in the header of the serialised data.

The diagram 900 illustrates an illustrative example of multi-symbol encoding in which a stream [a, a, a] is converted to a multi-symbol $s_1$, the stream [b, b] is converted to $s_2$, and the symbol c to $s_3$. In this example, the aggregate symbol depths are $\beta_1=3$, $\beta_2=2$ and $\beta_3=1$ respectively, with n*=3.

The setup of the β vector for a given current coding window is based on, in an embodiment, the setup of the previous coding windows. A different weight w can be assigned to the previous windows, such as:

$$\beta_j(s_i) = w_{j-1}\beta_{j-1}(s_i) + (1 - w_{j-1})\frac{2}{(j-2)(j-1)}\sum_{k=1}^{j-2}\beta_k(s_i)$$

Therefore, the aggregate symbol depth at step j for symbol $s_i$, i.e., $\beta_j(s_i)$, can be approximated to the nearest integer represented as weighted sum between the previous step, $\beta_{j-1}(s_i)$, and the average symbol depth in the previous j−2 steps, in an embodiment. Using this formula, both coder and decoder are able to synchronize their symbol probability ranges. Multiple weights can also be defined as:

$$\beta_j(s_i) = w_{j-1}\beta_{j-1}(s_i) + w_{j-2}\beta_{j-2}(s_i) + (1 - w_{j-1} - w_{j-2})\frac{2}{(j-3)(j-2)}\sum_{k=1}^{j-3}\beta_k(s_i)$$

All weights are in the real range [0, 1] and their sum must be equal to one.

In an embodiment, we established how to compute an aggregate symbol depth, and establish what a given aggregate symbol represents. In the previous example in FIG. 8, we defined $s_1$ a repetitions of symbols [a], $s_2$ a repetitions of symbols [b] and so on. If the dictionary is small enough (e.g. less than 10 symbols), the full set of combinations can be pre-arranged. For example, a set of aggregate symbol combinations may map to identifiers in the following manner:

| Identifier | Aggregate symbol combination |
|---|---|
| 0 | [a, a, a, . . .] |
| 1 | [a, b, a, b, a, b, . . .] |
| 2 | [a, b, b, a, b, b, a, b, b, . . .] |
| 3 | [a, c, a, c, a, c, . . .] |
| . . . | . . . |

Figure 10:
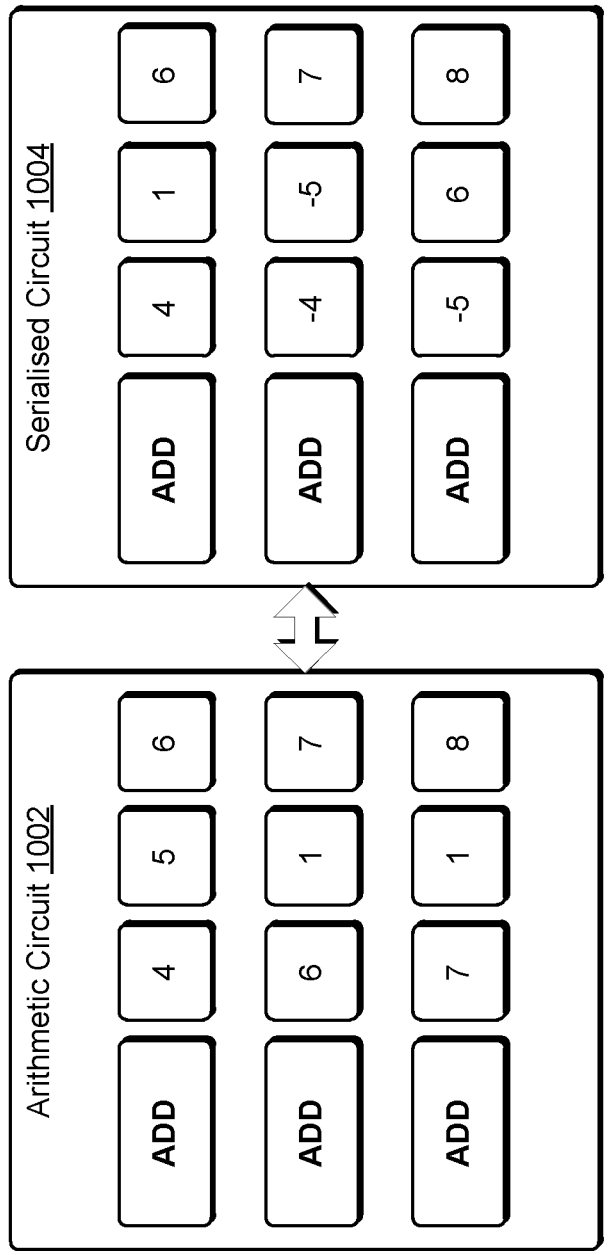
FIG. 10 illustrates a diagram in which an arithmetic circuit is compressed by aggregating identifiers, resulting in the generation of a serialised circuit, which can be further compressed.

FIG. 10 illustrates a diagram 1000 in which an arithmetic circuit 1002 is compressed using an arithmetic encoding technique to aggregate identifiers, resulting the generation of a serialised circuit 1004 which can be further compressed (e.g., as compared to systems in which identifiers are not aggregated). In an embodiment, operators and identifiers are encoded separately—for example, encoded using different techniques and stored using different data structures (e.g., a first queue for operators and a second queue for identifiers). FIG. 10 illustrates an example serialisation of identifiers, according to at least one embodiment. In an embodiment, a compression process utilising arithmetic encoding techniques is applied to the arithmetic circuit 1002 to generate the serialised circuit 1004 which is smaller in size (e.g., stored using less bits of data) than the arithmetic circuit 1002. In an embodiment, the serialised circuit 1004 is, on average (e.g., as determined based on a population of arithmetic circuits or expected circuit operations/values), smaller in size than the arithmetic circuit 1002. In an embodiment, an arithmetic encoding is a type of lossless compression that, if applied to the arithmetic circuit 1002, generates a result (i.e., the serialised circuit 1004) that can perfectly re-produce (e.g., bit-for-bit accuracy) the arithmetic circuit 1002 by applying a lossless de-compression routine.

In an embodiment, whether an entropy scheme is utilised to encode a circuit or portion of a circuit (e.g., whether to encode identifiers, whether to encode operators) is determined based on how the data is generated, the size of symbols, or a combination thereof. For example, in some embodiments, identifiers are not encoded using an entropy scheme because of the random nature of their generation and/or the size of the symbols. Generally speaking, bigger circuits have more identifiers, increasing the size of the symbols.

In an embodiment, an aggregation of identifiers can take advantage of locality of identifiers as part of a compression scheme, which may be appropriate to use based on data locality—that is, that identifiers used in the same portion of a circuit tend to have similar values. It should be noted that this may not be true in all circuits, and that the aggregation of identifiers may be performed based on making a determination (e.g., analysis of circuit prior to serialisation) whether to perform the aggregation techniques described in greater detail below.

As part of an aggregation technique, the difference between two identifiers rather than the absolute values are coded. In an embodiment, this scheme is applied to input identifiers and not applied to output identifiers. In an embodiment, output identifiers are incremental and are not required during the coding process, and can be removed and re-constructed based on the order in which operations are serialised As an illustrative example, consider the following circuit or portion of a circuit:
  ADD 4 5 6
  ADD 1 6 7
  ADD 1 7 8
The identifiers can be encoded as follows:
  ADD 4 1 6
  ADD −4 5 7
  ADD −5 6 8

The first input (4) is normally encoded. The second input is encoded as the difference between the second input and the preceding input, in other words: 5−4=1. The next identifier is an output and is ignored for aggregation purposes. Continuing to the second addition operation, the third input is encoded as the difference between the third input and second input: 1−5=−4, and so on. In an embodiment, one of the advantages of this scheme is readily appreciated in the context of large circuits having many identifiers (e.g., large identifiers require additional bits of data to encode the absolute identifier values). On average, if n bits are required to encode an identifier, less than n/2 bits are required to encode the differences. In an embodiment, the input wires can be re-arranged in order to reduce and/or minimise the values of the differences (e.g., less bits are required to encode them in a lossless and perfectly reproducible manner):
  ADD 4 1 6
  ADD −4 0 7
  ADD 5 1 8

Considering an extra bit to represent the sign, the first solution requires 14 bits to encode the 5 coded input identifiers [1, −4, 5, −5, 6], while the second solution requires only 10 bits to encode the coded identifiers [1 −4 0 5 1]. The inputs of each line can be re-arranged during the circuit creation in order to minimise the total bits required.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method comprising:
   obtaining a set of symbols based on an arithmetic circuit representing a smart contract by parsing a file encoding the arithmetic circuit to identify a set of operators and sets of parameters for at least a portion of the set of operators, wherein the set of symbols are the operators and/or input wires;
   reducing an amount of data to store the arithmetic circuit by at least:
     mapping a subset of the set of symbols to a range of coded values;
     selecting a coded value within the range of coded values; and
     representing, in a compressed arithmetic circuit, the subset of the set of symbols with the coded value; and
   causing the compressed arithmetic circuit to be stored on node of a blockchain network.

2. A method according to claim 1, wherein the compressed arithmetic circuit comprises a header encoding information usable to map subsets of the set of symbols to different ranges of coded values.

3. A system, comprising:
   a processor; and
   memory including executable instructions that, as a result of execution by the processor, causes the system to perform the computer-implemented method of claim 2.

4. A non-transitory computer-readable storage medium having stored thereon executable instructions that, as a result of being executed by a processor of a computer system, cause the computer system to at least perform the computer-implemented method of claim 2.

5. A method according to claim 1, wherein the coded value is a binary fraction.

6. A system, comprising:
   a processor; and
   memory including executable instructions that, as a result of execution by the processor, causes the system to perform the computer-implemented method of claim 5.

7. A method according to claim 1, wherein the coded value is selected based on the coded value being representable using a threshold number of bits.

8. A system, comprising:
   a processor; and
   memory including executable instructions that, as a result of execution by the processor, causes the system to perform the computer-implemented method of claim 7.

9. A method according to claim 1, wherein selecting the coded value comprises:
   mapping a different subset of the set of symbols to a sub-range of the range of coded values;
   selecting the coded value from within the sub-range of the range of coded values; and
   wherein both the first subset and a second subset of symbols are represented by the coded value in the compressed arithmetic circuit.

10. A method according to claim 1, further comprising:
    receiving a request to serialise an input file, the input file comprising a plurality of lines of code representing the arithmetic circuit;
    scanning at least a portion of the plurality and adding symbols of the set of symbols to a data structure; and
    wherein the set of symbols is obtained from the data structure.

11. A method according to claim 1, further comprising encoding a symbol of the set of symbols as a difference between the symbol and another symbol of the set of symbols.

12. A method according to claim 1, wherein the arithmetic circuit comprises operators and wire identifiers, further wherein the set of symbols are operators and the wire identifiers are separately encoded according to an arithmetic coding scheme.

13. A method according to claim 1, wherein the range of coded values corresponds to a probability of the subset occurring in a pattern.

14. A method according to claim 1, wherein the subset of the set of symbols is one symbol.

15. A method according to claim 1, wherein the compressed arithmetic circuit is broadcast to the blockchain network in place of the arithmetic circuit.

16. A method according to claim 1, wherein a node of the blockchain network that receives the compressed arithmetic circuit is able to determine the arithmetic circuit from the compressed arithmetic circuit.

17. A system, comprising:
a processor; and
memory including executable instructions that, as a result of execution by the processor, causes the system to perform the computer-implemented method of claim 1.

18. A non-transitory computer-readable storage medium having stored thereon executable instructions that, as a result of being executed by a processor of a computer system, cause the computer system to at least perform the computer-implemented method of claim 1.

* * * * *